United States Patent Office 2,957,907
Patented Oct. 25, 1960

2,957,907

DIALLYL ESTER OF POLYCARBOXYLIC POLYOLEFINIC ACIDS

George B. Payne, Curtis W. Smith, and Paul R. Van Ess, Berkeley, Calif., assignors to Shell Oil Company, New York, N.Y., a corporation of Delaware No Drawing. Filed July 30, 1958, Ser. No. 751,882

3 Claims. (Cl. 260—485)

This invention relates to novel allyl esters of polycarboxylic polyolefinic acids and, more particularly, to allyl esters of 8,12-eicosadienedioic acid.

The diallyl ester of 8,12-eicosadienedioic acid is particularly valuable because it may be employed as an intermediate in the preparation of the epoxidized 8,12-eicosadienedioic acid which contains two internally positioned epoxy groups and two terminal polymerizable olefinic groups. It may also be employed in the preparation of the tetraepoxidized diallyl ester of 8,12-eicosadienedioic acid which has also been found of value.

The present application is a continuation-in-part of application Serial No. 397,011, filed December 8, 1953, now U.S. Patent No. 2,870,170, issued January 20, 1959.

The acids from which the novel allyl esters of the present invention are made are obtained by treating a cyclic peroxide with a compound having a conjugated system of double bonds, such as butadiene and cyclopentadiene, in the presence of a heavy metal capable of existing in several valence forms, such as iron or cobalt. This method of preparation may be exemplified by the following equations showing the preparation of 8,12-eicosadienedioic acid from 1,1'-dihydroxydicyclohexyl peroxide (obtained from cyclohexanone and hydrogen peroxide) and butadiene in the presence of ferrous sulfate:

1.
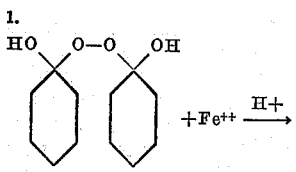
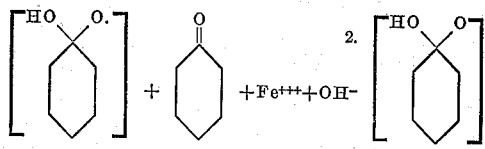

3. $\cdot CH_2CH_2CH_2CH_2CH_2COOH$
$+2CH_2=CHCH=CH_2 \rightarrow HOOC(CH_2)_5CH_2CH$
$=CHCH_2CH_2-CH=CHCH_2(CH_2)_5COOH$ The acid produced by the above process also contains minor quantities of other acids, such as 8-vinyl-10-octadecene-1,18-dioic acid.

Particularly advantageous cyclic peroxides to be used in the process are those represented by the formula

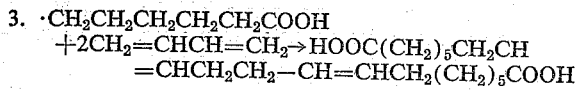

wherein Y is a hydrogen atom, a

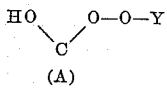

radical, or a

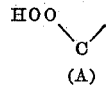

radical, and A is a divalent radical containing a chain of no more than 5 carbon atoms between the two free bonds of the radical, and preferably divalent hydrocarbon radicals which may be substituted, if desired, with functional groups, such as hydroxy, nitro, cyano, carboxy, ester, ether and sulfone groups and halogen atoms.

Cyclic peroxide compounds to be used in the above process are preferably obtained by reacting hydrogen peroxide with a cyclic ketone of the formula

wherein A is a divalent radical as described above. These peroxides can be produced as described in Milas, U.S. 2,298,405, the products from equimolar amounts of cyclic ketone and hydrogen peroxide being chiefly the 1-hydroxy-1'-hydroperoxydicycloalkanyl peroxides

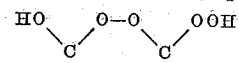

Preferred cyclic peroxides for use in the present process are the 1,1'-dihydroxydicycloalkanyl peroxides

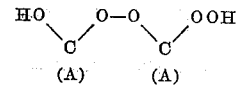

obtainable by the use of two moles of cyclic ketone per mole of hydrogen peroxide.

The A in the above-described formula of the cyclic ketone may be an unsubstituted alkylene group or alkylene group substituted with methyl, ethyl, propyl, butyl, benzyl, phenyl, cyclohexyl, chloro, bromo, hydroxy, methoxy, keto substituents, and the like. A may also form a part of a phenyl or cyclohexyl ring. Representative examples of suitable divalent radicals include:
$-CH_2CH_2CH_2-$,

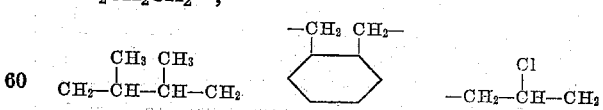

$-CH_2-CH-CH_2-CH_2-$, and the like.

Conjugated diethylenic compounds which can be reacted with the above-described cyclic peroxide compounds to produce the polyethylenic carboxylic acids include, among others, the conjugated diolefins, such as those of 4 to 18 carbon atoms as 1,3-butadiene, 1,3-pentadiene, isoprene, dimethyl-1,3-butadiene, 1,3,5-hexatriene, 2-ethyl-1,3-pentadiene, 2,4-octadiene, 1,1-dimethyl-3-tertiary butyl-1,3-butadiene, 2-phenyl-1,3-butadiene,1,4-diphenyl-1,3-butadiene, 2-benzyl-1,3-butadiene, 2-cyclohexyl-1,3-butadiene, 1,1-diphenyl-3,5-hexadiene, cyclopentadiene, 1,3- cyclohexadiene, 1-methyl-2,4-cyclopentadiene, 2-methyl-1,3-cyclopentadiene, the mono- and di-methyl1,3-cyclohexadienes, 1-vinyl-1-cyclohexene, 1-tertiary butyl-1,3-cyclohexadiene, and 1,3-cycloheptadiene are typical, and substitution products of such conjugated diolefins having as substituents functional groups such as hydroxy, nitro, cyano, carboxy, ester, ether and sulfone groups or halogen atoms. As halogenated conjugated diethylenic compounds, those containing one or more atoms of fluorine, chlorine and/or bromine are preferred. Representative examples of suitable halogenated conjugated diethylenic starting materials are chloroprene, 2,3-dichloro-1,3-butadine, 1-chloro-2-methyl-1,3-butadiene, 2-chloro-1,3-pentadiene, 1-chloro-2,4-cyclopentadiene, 1-chloromethyl-2,4-cyclohexadiene, and the like. Other substituted conjugated diethylenic compounds which can be used successfully as starting materials are, for example, conjugated diethylenic alcohols such as 2,4-hexadiene-1-ol, 1,3-hexadiene-5-ol, 2,4-octadiene-6-ol and 2,4,6-octatriene-1-ol, etc.; ethers such as 2-methoxy-1,3-butadiene, 2-ethoxy-1,3-butadiene, 1-ethoxy-2,3-cyclohexadiene, etc.; carboxylic acids of which vinyl acrylic acid, sorbic acid (2,4-hexadienoic acid), 4-methyl-2,4-pentadienoic acid, and muconic acid are typical, and esters of such acids, such as the methyl, ethyl, isopropyl, tertiary butyl, 2-ethylhexyl, decyl, and the like. 1-cyano-1,3-butadiene, 3-nitro-1,3-butadiene, 1-methylsulfonyl-1,3-butadiene, 3-vinyl-3-sulfolene, and the like, are examples of other suitable conjugated diethylenic compounds which may be used in the above-described process.

Preferred compounds having the conjugated system of double bonds to be used in the process are those of the formula $$R-C=CH-CH=CH-R$$
$$\phantom{R-}R\phantom{=CH-CH=CH-}R$$

and

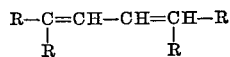

R and $R_1$ are members of the group consisting of hydrogen or hydrocarbon radicals, and preferably aliphatic hydrocarbon radicals containing from 1 to 8 carbon atoms and $R_2$ is a divalent alkylene group containing from 1 to 3 carbon atoms or a substituent derivative thereof which has one or more of the hydrogen atoms replaced by hydrocarbon radicals.

The proportions in which the cyclic peroxide and the compound possessing the conjugated system of double bonds are employed in the reaction may vary over a considerable range. In most cases, the peroxide and the compound possessing the conjugated system of double bonds will be employed in approximately equal molecular amounts, but larger or smaller amounts may be used if desired. Preferably, one mole of the peroxide will be reacted with from 1 to 2 moles of the compound possessing the conjugated system of double bonds.

The heavy metals, such as iron and cobalt, are employed in the reaction in at least equivalent amounts. The expression "equivalent amount" in this regard refers to that amount required for the formation of free radicals from one molecule of peroxide. The heavy metals are preferably employed in amounts varying from 1 to 1.5 equivalents.

In place of the equivalent or excess amounts of the heavy metals, however, one can use smaller amounts of the metals together with a reducing agent which serves to convert the metal ions back to the lower valence form, e.g., ferric ions to ferrous ions, as fast as they are formed. Examples of such reducing agents include 1-ascorbic acid, sodium formaldehyde sulfoxylate, sodium bisulfite, reducing sugars, and the like.

The reaction between the peroxide and the compound possessing the conjugated system of double bonds may be effected in water, solvents or emulsions. The reaction is preferably carried out in the presence of common solvents, such as methanol, ethanol, tertiary butanol, benzene, diethyl ether, methyl acetate, acetone, dioxane, and the like, or mixtures thereof or mixtures of these solvents with water.

Temperatures employed in the reaction between the peroxide and the compound possessing the conjugated system of double bonds may vary over a considerable range, but is generally maintained between about $-40°$ to $80°$ C. Pressures may be atmospheric, superatmospheric or subatmospheric.

It will thus be apparent that the acids, the allyl esters of which are contemplated by the present invention may be represented by the following structural formula

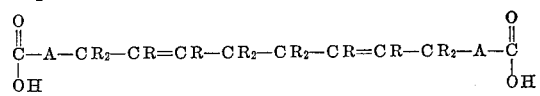

wherein R may be hydrogen, a halogen, preferably chlorine, or a hydrocarbon radical, and A is a divalent radical.

8,12-eicosadienedioic acid which constitutes the preferred acid from which the allyl esters of the present invention are made was made in accordance with the following procedure: Into a three-necked flash equipped with a Tru-bore stirrer, dropping funnel and Dry Ice condenser, and provided with a means of maintaining a nitrogen atmosphere, was introduced a solution of 75 g. of urea in 150 ml. of redistilled water. The flask was cooled to $-10°$ C. and 75-100 g. of butadiene was added, followed by 0.2 mole (26.4 g.) cyclohexanone peroxide (Lucidol Corp.)—titre 109, calculated for

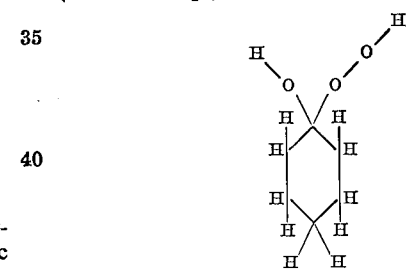

To this mixture was added dropwise 0.2 mole ferrous ammonium sulfate hexahydrate dissolved in 350–400 ml. distilled water. The ferrous ammonium sulfate solution was added over a period of 2 hours while the whole was stirred vigorously. The butadiene was allowed to evaporate off and there remained a suspension of the iron salts of the reaction products. The residue, after evaporation of the butadiene, was treated with 4 N HCl, ethanol and ether to recover the organic acids and other products from the ferric salts. The alcohol ether extract was washed with water exhaustively until no more $FeCl_3$ dissolved in the water. The ether extract was then extracted with 4 N sodium hydroxide to remove the organic acids. The alkaline extract was acidified with 4 N HCl and the liberated acids extracted with ether. After washing and drying the ether solution, the ether was removed and a residue of organic acids remained (which, in part, crystallized). The weight of acids varied between 18–22 g. Yield: 53–65% of theory for $C_{20}$ diethylenic dibasic acid,

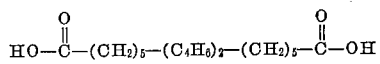

based on the cyclohexanone peroxide used. The same products were formed when hydrogen peroxide (1 mole) was added to a mixture of cyclohexanone (2 moles), water, urea and butadiene (in the amounts stated above), followed by slow addition of ferrous ammonium sulfate, or a suspension of ferrous pyrophosphate (one mole equivalent on the basis of the hydrogen peroxide used). The reaction is preferably carried out at $0°$ to $-10°$ C.

The diallyl ester was made from the acid, the preparation of which is described above, in accordance with the following procedure: 508 g. (1.50 moles) of 8,12-eicosadienedioic acid, 437 g. (7.5 moles) of allyl alcohol, 4.7 g. (0.5% of charge) of p-toluenesulfonic acid and 200 ml. of toluene were refluxed in conventional refluxing equipment. Removal of 79 ml. of water was essentially complete in approximately three hours. The reaction mixture was stripped of allyl alcohol and toluene and the residue Claisen-distilled, yielding the diallyl ester of 8,12-eicosadienedioic acid which was straw yellow in color.

|  | Found | Calc'd for $C_{26}H_{42}O_4$ (418.3) |
|---|---|---|
| B.P. | 232–236° C. (0.2–0.3 mm.) |  |
| $n_D^{20}$ | 1.4726 |  |
| Ester value, eq./100 g. | 0.479 | 0.484 |

The diallyl ester of 8,12-eicosadienedioic acid has found particular utility in the preparation of the diallyl ester of epoxidized 8,12-eicosadienedioate which was prepared in accordance with the following procedure: Eighty-four parts (0.2 mole) of diallyl 8,12-eicosadienedioate (prepared by reacting 8,12-eicosadienedioate with allyl alcohol) was added to 500 parts of chloroform. One hundred twelve parts of a 27% peracetic acid solution was then added to the mixture and the resulting mixture allowed to stand at 0° C. to 10° C. for 12 hours. The product was then washed with ice water, cold 20% sodium hydroxide, ice water and then filtered through sodium sulfate, chloroform was then taken off and the product concentrated to a viscous liquid (boiling point of about 235° C. at 15 mm.) which was the diallyl ester of epoxidized 8,12-eicosadienedioate. Ester value 0.485 eq./100 g., iodine value 132 eq./100 g., alpha-epoxy value 0.137, direct oxygen percent weight 19.7.

About 5 parts of stannic chloride in chloroform was slowly added to 100 parts of the above-described epoxidized ester. In a short period, the product set up to a soft solid. One hundred parts of the epixodized ester was also heated with 2% benzoyl peroxide to form a soft solid. Then 3 parts of the 2,4,6-tri(dimethylaminomethyl)phenol and 2 parts of benzoyl peroxide are added to 100 parts of the above ester and the mixture heated to 70° C. The epoxidized ester set up to a very hard casting.

The diallyl ester of epoxidized 8,12-eicosadienedioate manifests outstanding utility as a stabilizer and plasticizer and as a monomer for the preparation of valuable polymeric products. The outstanding value of the epoxidized diallyl ester is due to the fact that the compound contains two internally positioned epoxy groups and in addition two olefinic bonds in the terminal portions of the molecule, that is, in the diallyl moiety. Because of these active olefinic groups in the terminal portions of the allyl ester it is possible to either prepare the diallyl ester of epoxidized 8,12-eicosadienedioate as indicated above, which product may in turn be polymerized through these olefinic groups, or it is also possible to prepare the tetraepoxidized diallyl ester of 8,12-eicosadienedioate. Thus, the diallyl ester of the present invention shows surprising and unique utility when compared to homologous diallyl esters which, because of the absence of olefinic bonds, may not be polymerized and cannot form the tetraepoxidized ester.

We claim as our invention:

1. The diallyl ester of an acid of the formula

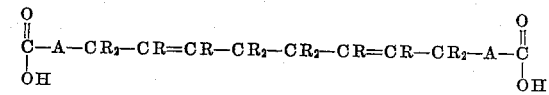

wherein R is selected from the group consisting of hydrogen, chlorine and aliphatic hydrocarbon radicals containing from 1 to 8 carbon atoms, and A is a divalent hydrocarbon radical consisting of alkylene having a chain of from 2 through 5 carbon atoms between the two free bonds of the radical.

2. The diallyl ester of an acid of the formula

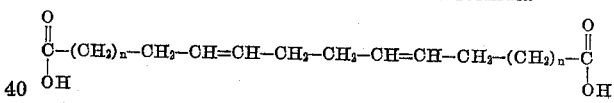

wherein $n$ is an integer ranging from 2 through 5.

3. Diallyl ester of 8,12-eicosadienedioic acid.

No references cited.